United States Patent [19]

Fábry et al.

[11] 4,004,609
[45] Jan. 25, 1977

[54] MATERIAL TRANSMITTING ELEMENT FOR CONTACTING STREAMING MEDIA OF DIFFERENT PHASES OR THE SAME PHASE

[75] Inventors: György Fábry; Istvan Takács; György Kiszely, all of Budapest, Hungary

[73] Assignee: Richter Gedeon Vegyeszeti Gyar Rt., Budapest, Hungary

[22] Filed: Nov. 19, 1974

[21] Appl. No.: 525,216

Related U.S. Application Data

[62] Division of Ser. No. 255,733, May 22, 1972, abandoned.

[30] Foreign Application Priority Data

June 3, 1977  Hungary .............................. RI 433

[52] U.S. Cl. ......................... 137/512.15; 138/46; 261/114 VT
[51] Int. Cl.² ................................... F16K 15/14
[58] Field of Search ...... 137/512.15, 512 A, 525.3, 137/525.5, 517, 518, 521, 525; 138/40, 43, 45, 46, 38; 261/114 VT, 114 TC, 102, 105, 109, 110

[56] References Cited

UNITED STATES PATENTS

| | | | |
|---|---|---|---|
| 2,094,707 | 10/1937 | Jones | 138/45 |
| 2,599,499 | 6/1952 | Thorstenson | 137/525.3 X |
| 2,833,305 | 5/1958 | Muckley et al. | 137/516.13 |
| 3,246,887 | 4/1966 | De Goederen | 261/114 VT |
| 3,312,237 | 4/1967 | Mon et al. | 137/525.3 X |
| 3,530,879 | 9/1970 | Nutter | 261/141 VT |
| 3,581,773 | 6/1971 | Warren | 138/46 |

FOREIGN PATENTS OR APPLICATIONS 1,091,975  11/1954  France ........................ 137/512.15

*Primary Examiner*—William R. Cline
*Attorney, Agent, or Firm*—Young & Thompson

[57] ABSTRACT

A fluid transmitting element, particularly for increasing vapor-liquid contact, comprises a continuously open element which is resiliently deformable to open still farther under the pressure of a fluid stream. The element is a plate or tray which comprises a fluid barrier, and has a plurality of resilient interfingering strips. Means are provided which permit opening of the element in only one direction.

2 Claims, 3 Drawing Figures

MATERIAL TRANSMITTING ELEMENT FOR CONTACTING STREAMING MEDIA OF DIFFERENT PHASES OR THE SAME PHASE

This is a division, of application Ser. No. 255,733, filed May 22, 1972 and now abandoned.

The present invention relates to fluid transmitting elements suitable for the transmission of a single fluid or for the contacting of the same or different flowing fluids to promote chemical or physical interaction between the streams of fluid. The present invention has particular utility in chemical process industries and the like, in which chemical engineering unit operations involving mass transfer and/or heat transfer take place. Examples of the unit operations augmented by the present invention are distillation, rectification, evaporation, extraction, absorption, desorption, heat exchange and the like. The practice of the present invention in connection with these and other operations results in a saving of space, the reduction of weight, and the reduction of manufacturing costs and power costs and other costs of operation.

It is known in this art to provide such elements with orifices of constant dimensions for the transmission therethrough of a fluid stream or streams. These elements have the drawback of so-called "inelastic operation," which means that they do not adapt to varying operational conditions.

To eliminate this drawback, numerous solutions have been proposed so as to provide an orifice of variable dimensions, such as a lifting cap as disclosed in French Pat. No. 1,263,434 or a lifting ring as in French Pat. No. 1,519,101.

However, such devices have the disadvantage that they cannot in all cases intensify to the desired extent the internal mixing of the media which are brought into contact by them. Also, the weight and space requirements of said apparatus entail extra power consumption, increased material consumption, and higher capital costs. Moreover, the wear of the moving parts employed by such devices is undesirable.

Accordingly, it is an object of the present invention to provide fluid transmitting means, which obviates the above difficulties and disadvantages.

Another object of the present invention is the provision of liquid-vapor contact apparatus, comprising a plurality of means which overcome the above disadvantages.

Finally, it is an object of the present invention to provide liquid transmitting means, more particularly liquid-vapor contact apparatus and elements thereof, which will be relatively simple and inexpensive to manufacture, easy to install, operate, maintain and repair, and rugged and durable in use.

Other objects, features and advantages of the present invention will become apparent from a consideration of the following description, taken in connection with the accompanying drawings, in which.

Figures 1, 2:
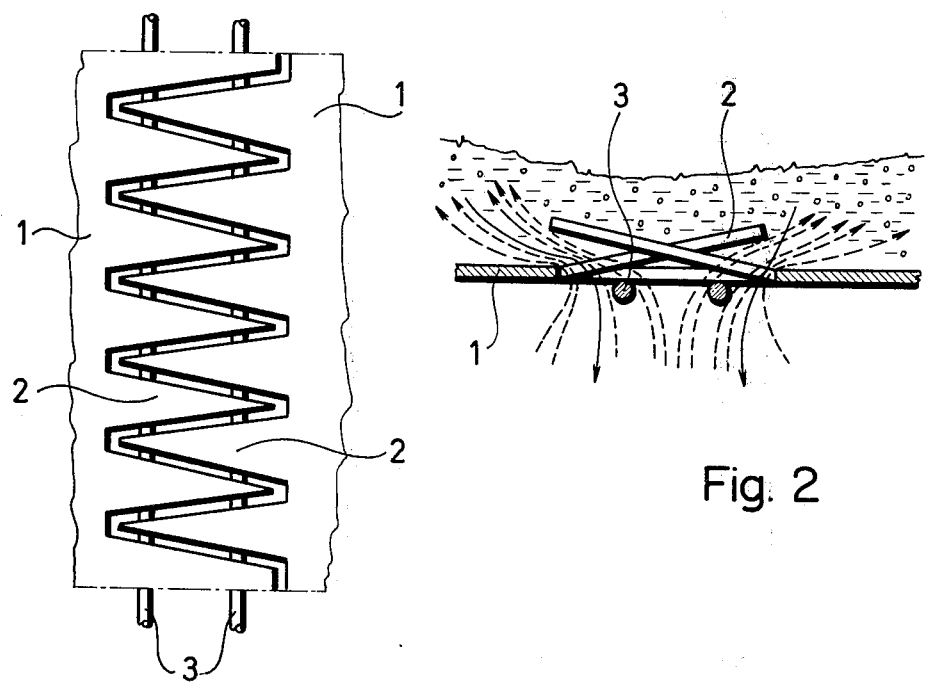
FIG. 1 is a fragmentary plan view of the present invention.
FIG. 2 is a side cross-sectional view of the invention, shown in operation.

In the accompanying drawings, the flow lines shown in full line indicate liquid paths while the flow lines shown in broken lines indicate vapor paths.

Referring now to the drawings in greater detail, there is shown a material transmitting element wherein sawtooth-like members 2 are formed from a plate such that the sawteeth interfinger. In operation the members 2 take up the position shown in FIG. 4 and in this way the flow orifices are formed for the media of the same or different phases to be contacted. It is also possible to provide a construction, which may from a fabrication viewpoint be more expedient, wherein the members 2 are made as separate elements and are detachably or non-detachably secured to a supporting rod or plate.

The rods 3 secured to the base plate 1 limit the movement of the members to prevent the occurrence of any permanent deformation of the members. For example, this need may arise when the liquids rushes down on shutting down the apparatus.

Figure 3:
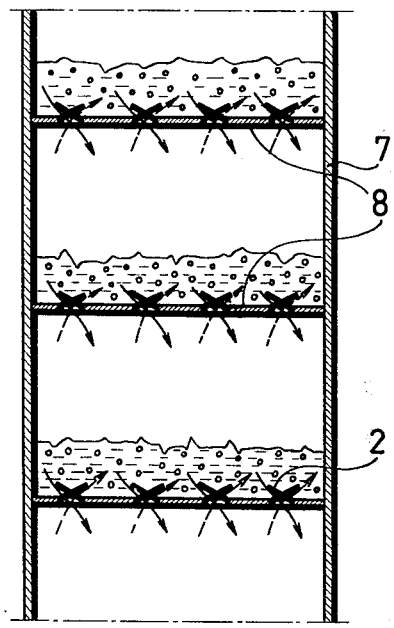
FIG. 3 is a somewhat diagrammatic fragmentary cross-sectional view of vapor-liquid contact apparatus having material transmitting elements according to the invention.

In FIG. 3 is shown a possible mode of utilization of the material transmitting elements according to the invention in connection with a tower-like apparatus provided with plural superposed trays, which may be an absorber or fractionator or the like. In this apparatus trays 8 are built into the space defined by the tower wall 7 and the material transmitting elements shown in FIGS. 1 and 2 are arranged on these trays.

It will be appreciated from the embodiment described above by way of example, that the material transmitting element according to the invention differs from the valves or sliding gates generally designated as material transmitting devices in that it has no regulating means for enabling outside interference and serving to alter the orifice during operation, and in that the members used as the elements are themselves capable of a resilient change of shape and, as a consequence of this change of shape, the transmitting orifices can change their dimensions in operation. Furthermore, the members carry out a pulsating or oscillating movement under the effect of the varying forces applied to them.

With the material transmitting elements according to the invention, the efficiency of apparatus used in chemical process industries may be very significantly improved without increasing the spatial requirements, weight and fabrication costs of the apparatus and without substantially increasing the amount of the critical materials used. All these results can be achieved by the proposed material transmitting element, because, as is already obvious from the described example, the streaming contact between media of the same phase or different phases becomes very intensive during passage through the element, and thereby the chemical or physical processes are intensified.

It will be apparent that the fluid transmitting elements according to the invention may be integral with or a separate piece from, or detachable from the supports such as trays with which they are associated. When separate, they may be assembled by welding or screwing or the like. The material of the elements is elastically deformable, such as steel or stainless steel. However, the material may also be a catalyst for a reaction with or between the media flowing through it, or may comprise a base of resilient material with a coating of catalyst thereon.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention, as defined by the appended claims.

Having described our invention, we claim:

1. A fluid transmitting element for increasing vapor-liquid contact, said element having at least one flow opening therethrough, and a flow control member disposed in said opening, said flow control member comprising a resilient flat metal plate having a plurality of interfingering strips integral therewith, said strips being coplanar with each other and with said plate and spaced apart in their undeformed condition and defining between them a zigzag slot, said strips on each side of said slot having the configuration of a straight series of sawteeth.

2. A fluid transmitting element for increasing vapor-liquid contact, said element having at least one flow opening therethrough, a flow control member disposed in said opening, said flow control member comprising a resilient flat metal plate having a plurality of interfingering strips integral therewith, said strips being coplanar with each other and with said plate and spaced apart in their undeformed condition, and means preventing movement of said strips out of the plane of the plate in one direction, said last-named means comprising rod means secured to the plate and underlying said strips.

* * * * *